(12) United States Patent
Iscan et al.

(10) Patent No.: US 12,113,652 B2
(45) Date of Patent: Oct. 8, 2024

(54) APPARATUS FOR MULTI-LEVEL ENCODING

(71) Applicant: Huawei Technologies Co., Ltd., Shenzhen (CN)

(72) Inventors: Onurcan Iscan, Munich (DE); Ronald Boehnke, Munich (DE); Wen Xu, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 25 days.

(21) Appl. No.: 17/728,659

(22) Filed: Apr. 25, 2022

(65) Prior Publication Data

US 2022/0263694 A1   Aug. 18, 2022

Related U.S. Application Data

(63) Continuation of application No. PCT/EP2019/079266, filed on Oct. 25, 2019.

(51) Int. Cl.
*H04L 25/49* (2006.01)
*H04L 25/02* (2006.01)
*H04L 25/03* (2006.01)

(52) U.S. Cl.
CPC ...... *H04L 25/4917* (2013.01); *H04L 25/0224* (2013.01); *H04L 25/03929* (2013.01)

(58) Field of Classification Search
CPC ..... H04L 1/0042; H04L 1/0058; H04L 1/007; H04L 25/0224; H04L 25/03929; H04L 25/4917
See application file for complete search history.

(56) References Cited

U.S. PATENT DOCUMENTS

| | | | |
|---|---|---|---|
| 10,523,480 B1* | 12/2019 | Gultekin | H04L 1/0042 |
| 2010/0136903 A1* | 6/2010 | Lee | H04L 25/03343 |
| | | | 455/17 |

(Continued)

FOREIGN PATENT DOCUMENTS

| | | |
|---|---|---|
| EP | 1324558 A1 | 7/2003 |
| RU | 2475998 C2 | 2/2013 |

(Continued)

OTHER PUBLICATIONS

Arafa et al., "Multilevel Coding Schemes Using LDPC Codes with Signal Shaping for Spectral Efficient Data Communication Systems," 2019 IEEE Symposium on Computers and Communications (ISCC), Total 6 pages, XP033694986, Institute of Electrical and Electronics Engineers, New York, New York (Jun. 29-Jul. 3, 2019).

(Continued)

*Primary Examiner* — Nader Bolourchi
(74) *Attorney, Agent, or Firm* — Leydig, Voit & Mayer, Ltd.

(57) ABSTRACT

The present disclosure provides an apparatus and method for multi-level encoding of an input message sequence into a symbol sequence, for instance, based on polar coding. The input message comprises information bits. The apparatus is configured to divide the input message into a plurality of sub-messages, encode each of the sub-messages into a codeword, wherein a set of the sub-messages is encoded on the basis of the codewords obtained by encoding the sub-messages not in the set and a predefined function of the symbol sequence, and map the encoded sub-messages into corresponding symbols.

9 Claims, 12 Drawing Sheets

(56) References Cited

U.S. PATENT DOCUMENTS

| | | | |
|---|---|---|---|
| 2015/0091742 | A1 | 4/2015 | Ionita et al. |
| 2017/0126354 | A1* | 5/2017 | Marsland ................ H04L 1/203 |
| 2019/0149387 | A1 | 5/2019 | Torbatian et al. |
| 2019/0158222 | A1* | 5/2019 | Kurmaev .......... H03M 13/6356 |

FOREIGN PATENT DOCUMENTS

| | | |
|---|---|---|
| RU | 2718171 C1 | 3/2020 |
| WO | 2019015743 A1 | 1/2019 |
| WO | 2020083491 A1 | 4/2020 |

OTHER PUBLICATIONS

"Signal shaping for QAM constellations," 3GPP TSG RAN WG1 NR Ad Hoc Meeting, Spokane, USA, R1-1700076, Total 8 pages, 3rd Generation Partnership Project, Valbonne, France (Jan. 16-20, 2017).

Matsumine et al., "Polar-Coded Modulation for Joint Channel Coding and Probabilistic Shaping," 2019 Optical Fiber Communications Conference and Exhibition (OFC), OSA, XP033540610, Total 3 pages, Institute of Electrical and Electronics Engineers, New York, New York (Mar. 3-7, 2019).

"Non-Uniform Constellations in NR," 3GPP TSG RAN WG1 NR adhoc, Spokane, USA, R1-1700679, Total 5 pages, 3rd Generation Partnership Project, Valbonne, France (Jan. 16-20, 2017).

Scan et al., "Probabilistically Shaped Multi-Level Coding with Polar Codes for Fading Channels," 2018 IEEE Globecom Workshops (GC Wkshps), Total 5 pages, Institute of Electrical and Electronics Engineers, New York, New York (Dec. 2018).

"WF on Enhanced Modulation Schemes," 3GPP TSG RAN WG1 Nr Ad-Hoc Meeting, Spokane, USA, R1-1701534, Total 8 pages, 3rd Generation Partnership Project, Valbonne, France (Jan. 16-20, 2017).

"Series V: Data Communication Over the Telephone Network, Interfaces and voiceband modems—A modem operating at data signalling rates of up to 33 600 bit/s for use on the general switched telephone network and on leased point-to-point 2-wire telephone-type circuits," ITU-T Recommendation V.34 (Previously CCITT Recommendation), ITU-T Telecommunication Standardization Sector of ITU, Total 79 pages, International Telecommunication Union, Geneva, Switzerland (Feb. 1998).

"ATSC Standard: Physical Layer Protocol (A/322)," Doc. A/322:2018, Advanced Television Systems Committee, Washington, D.C., Total 263 pages (Dec. 26, 2018).

Iannone et al., "Increasing Cable Bandwidth Through Probabilistic Constellation Shaping," SCTE•ISBE and NCTA, 2018 Fall Technical Forum, Cable-Tec Expo, Total 14 pages, Atlanta, GA (Oct. 22-25, 2018).

Nokia "Photonic Service Engine (PSE) Coherent DSPs," Total 5 pages (2010).

Li et al., "Field Trial of Probabilistic-Shaping-Programmable Real-Time 200-Gb/s Coherent Transceivers in an Intelligent Core Optical Network," 2018 Asia Communications and Photonics Conference (ACP), Total 3 pages, doi: 10.1109/ACP.2018.8596031., Institute of Electrical and Electronics Engineers, New York, New York (Oct. 26-29, 2018).

Zhu et al., "Spectrally-Efficient Single-Carrier 400G Transmission Enabled by Probabilistic Shaping," 2017 Optical Fiber Communications Conference and Exhibition (OFC), OSA, Total 3 pages, Institute of Electrical and Electronics Engineers, New York, New York (Mar. 19-23, 2017).

Futurewei Technologies, "G.mgfast: Constellation Shaping with LDPC Coded Modulation," SG15-C.184, Study Group 15, Telecommunication Standardization Sector, Total 5 pages, International Telecommunication Union, Geneva, Switzerland (Jun. 19-30, 2017).

* cited by examiner

| $b_1$ | 1 | 0 | 1 | 0 | 1 | 0 | 1 | 0 |
|---|---|---|---|---|---|---|---|---|
| $b_2$ | 1 | 1 | 0 | 0 | 1 | 1 | 0 | 0 |
| $b_3$ | 1 | 1 | 1 | 1 | 0 | 0 | 0 | 0 |
| Decimal representation | 7 | 6 | 5 | 4 | 3 | 2 | 1 | 0 |
| x | -7 | -5 | -3 | -1 | 1 | 3 | 5 | 7 |

FIG. 10

APPARATUS FOR MULTI-LEVEL ENCODING

CROSS-REFERENCE TO RELATED APPLICATIONS

This application is a continuation of International Application No. PCT/EP2019/079266, filed on Oct. 25, 2019, the disclosure of which is hereby incorporated by reference in its entirety.

TECHNICAL FIELD

Embodiments of this present disclosure relate, in general, to the field of encoding messages. In particular, embodiments of the present disclosure relate to an apparatus and method for multi-level encoding of an input message into a symbol sequence, for instance, encoding based on polar coding. Embodiments of the disclosure also relate to an apparatus and method for multi-level decoding of an input symbol sequence. Embodiments of the disclosure are also concerned with providing the symbol sequence with a predefined characteristic.

BACKGROUND

In order to achieve the capacity of a transmission channel, the channel input symbols should have a certain probability distribution. For example, a Gaussian distribution is required to achieve the capacity of the AWGN channel with average transmit power constraint. However, in many practical systems, uniformly distributed channel input symbols are used, which cause a gap to the capacity. This loss is called the shaping loss, and can be up to 1.53 dB on AWGN channels, if uniformly distributed channel input symbols are used.

The shaping loss becomes significant especially for high-order modulation. In many systems, binary coded modulation is used, wherein input messages are first mapped to binary codewords (using a channel encoder), and the codewords are then further mapped to channel input symbols (such as Amplitude Shift Keying (ASK) or Quadrature Amplitude Modulation (QAM) symbols) via a symbol mapper. A symbol mapper takes in general m bits as input and converts them into a channel input symbol.

Usually, binary codewords have a uniform distribution of bits, i.e., the number of ones and zeros within a codeword is approximately the same on average. This causes the channel input symbols to also have a uniform distribution, which is the cause of the shaping loss, as for many channels uniformly distributed channel input symbols are not optimal.

Different methods to reduce the shaping loss (i.e., shaping methods) are known, such as Probabilistically Shaped Coded Modulation (PSCM) which can be realized based on Bit-Interleaved Coded Modulation (BICM) or Multi-Level Coding (MLC).

In BICM a message d is first encoded by a channel encoder to a code word c, which is interleaved and then mapped to channel input symbols x via a symbol mapper. At the receiver, a single stage demapping and decoding can be performed (see FIG. 1).

In MLC a message d is first divided into m parts ($d_1, \ldots, d_m$), wherein each part is then encoded with a different channel encoder resulting in codewords ($c_1, \ldots, c_m$) of the same lengths. A symbol mapper maps each bit from the m codewords into a different bit-level of a modulated symbol. At the receiver, each bit-level is demapped and decoded successively (i.e. multi-stage demapping), using the information obtained from decoding the previous bit-levels (see FIG. 2 and FIG. 3 for MLC transmitter and receiver, respectively).

In the work of Iscan et al. "*Probabilistically Shaped Multi-Level Coding with Polar Codes for Fading Channels,*" In 2018 IEEE Globecom Workshops (GC Wkshps), pp. 1-5, a polar coded PSCM scheme based on MLC is presented. In FIG. 4 a plot of the block diagram of this scheme is shown.

An example of the resulting probability distribution is given in FIG. 5. It can be observed that symbols near origin (which have low energy) have a higher probability than the symbols that are away from the origin (which have a high energy). This method is called 'single bit-level shaping'. It can be further observed that the resulting probability distribution is only a coarse approximation of the (optimal) Gaussian distribution. Therefore, this method only allows to obtain a limited shaping gain.

The following facts can be summarized about this conventional approach:
  The scheme in the work of Iscan et al. encodes each bit-level independently, and only a single bit-level is shaped.
  The resulting distribution is only a coarse approximation of the optimal distribution, and, therefore, only a limited shaping gain can be obtained.
  The encoder for the m bit-level is more complex than a conventional encoder.

In summary of the above, there is a need for an improved apparatus and method for encoding an input message into symbols.

SUMMARY

In view of the above-mentioned challenges and disadvantages, embodiments of the present disclosure aim to improve the conventional approaches for encoding an input message into a symbol sequence. An objective is thereby to provide an apparatus and a method for multi-level encoding, which allow reducing the shaping loss. In particular, it should be possible to provide the symbol sequence with a desired characteristic, e.g., with a predefined probability distribution of the symbols like a Gaussian probability distribution.

The objective of the present disclosure is achieved by the solution provided in the enclosed independent claims. Advantageous implementations of the present disclosure are further defined in the dependent claims.

According to a first aspect, an apparatus for multi-level encoding of an input message into a symbol sequence comprising information bits is provided. The apparatus is configured to divide the input message into a plurality of sub-messages; encode each of the sub-messages into a codeword, wherein a set of the sub-messages is encoded on the basis of the codewords obtained by encoding the sub-messages not in the set and a predefined function of the symbol sequence; and map the codewords into corresponding symbols.

The set of the sub-messages includes one or more sub-messages. This provides the advantage that the symbol sequence output by the apparatus can be provided to have a predefined characteristic, e.g. a predefined probability distribution, like one that approximates a Gaussian distribution. Thus, a large shaping gain is obtained. The shaping loss is therefore reduced, when transmitting the symbols sequence over a channel, e.g. an AWGN.

In an implementation form of the apparatus of the first aspect, the function is at least one of a probability distribution function of the symbols; a norm associated to the symbol sequence.

In an implementation form of the apparatus of the first aspect, the apparatus is configured to encode the set of the sub-messages such that after a symbol mapping of the plurality of codewords to a plurality of symbols, a predetermined probability distribution of the symbols is obtained.

This can provide the advantage that the symbols have a probability distribution, which approximates a Gaussian distribution, and accordingly a large shaping gain is obtained.

In a further implementation form of the apparatus of the first aspect, the apparatus is configured to encode each sub-message in the set of sub-messages by using a channel decoder.

In particular, the apparatus can encode each sub-message by using a device, which contains a channel decoder, or which is realized by a channel decoder. That is, the channel decoder can be included in a device. Using the channel decoder to encoder the sub-messages allows encoding them based on the codewords obtained by encoding the sub-messages not in the set. Thereby, the encoding of the sub-messages in the set can be influenced based on the predefined function of the symbols sequence. This provides the advantage that the shaping loss can be reduced.

In a further implementation form of the apparatus of the first aspect, the apparatus is further configured to allocate, to each sub-message in the set of sub-messages, a sequence of shaping bits, wherein each sequence of shaping bits is chosen based on the sub-message to which the sequence of shaping bits is allocated and on the codewords obtained by encoding the sub-messages not in the set.

In an implementation with polar codes, the sequence of shaping bits can be transmitted in polar sub-channels, particularly in reliable polar sub-channels. In this way, they can have an influence on how the resulting codewords are generated. Using some of the reliable sub-channels for the transmission of the sequence of shaping bits may reduce the transmission rate, but if chosen correctly they can have a positive effect on the resulting symbols (e.g. increase in the signal to noise ratio) such that this positive effect causes a larger gain than the loss in the transmission rate.

Each sequence of shaping bits may further be chosen based on the predefined function of the symbol sequence. The shaping bits provide the advantage that a symbol sequence with desired characteristics can be obtained, e.g. with a predefined probability distribution. For instance, a good approximation of non-uniform probability distribution, e.g. a Gaussian probability distribution can be achieved.

In a further implementation form of the apparatus of the first aspect, the apparatus is configured to map the codewords to symbols that have multiple bit-levels.

In a further implementation form of the apparatus of the first aspect, the apparatus is configured to map the codewords in such a way that at least one bit-level contains bits from only a particular codeword.

In a further implementation form of the apparatus of the first aspect, the at least one bit-level corresponds to a sign bit-level.

The sign bit-level is the bit-level, which defines the sign of the resulting symbol. If the resulting symbol is a complex number, then there are two bit-levels that define the sign of the real and the imaginary parts of the complex number.

In a further implementation form of the apparatus of the first aspect, the apparatus is configured to map the encoded sub-messages based on natural binary labelling, Gray labelling, or set partitioning labelling.

In a further implementation form of the apparatus of the first aspect, the probability distribution of the symbols is a non-uniform distribution.

This non-uniform distribution may be a Gaussian distribution. The non-uniform probability distribution provides the advantage that the shaping loss can be reduced.

In a further implementation form of the apparatus of the first aspect, the apparatus is configured to encode each sub-message in the set of sub-messages on the basis of polar coding.

This provides the advantage that the polarization effects of polar coding can be used in the encoding process.

In a further implementation form of the apparatus of the first aspect, the channel decoder is a polar decoder, for example a successive cancellation decoder, a list decoder, a belief propagation decoder or a flip decoder.

The channel decoder is in particular the one mentioned above. This provides the advantage that different decoders with a low complexity can be used.

In a further implementation form of the apparatus of the first aspect, the plurality of symbols are amplitude shift keying symbols or quadrature amplitude modulation symbols.

This provides the advantage that well known symbols can be used.

In a further implementation form of the apparatus of the first aspect, the apparatus is configured to provide the symbols to a receiver, and to further provide the receiver with at least one of the following parameters using a separate channel than for providing the symbols: a size of a sequence of shaping bits included in the symbols, predefined function of the symbol sequence, and a rule how the shaping bits are allocated.

According to a second aspect, the disclosure relates to a method for multi-level encoding of an input message into a symbol sequence comprising information bits, the method comprising the steps of dividing the input message into a plurality of sub-messages, encoding each of the sub-messages into a codeword, wherein a set of the sub-messages is encoded on the basis of the codewords obtained by encoding the sub-messages not in the set and a predefined function of the symbol sequence, and mapping the encoded sub-messages into corresponding symbols.

Implementation forms of the method of the second aspect can be developed according to the implementation forms of the apparatus of the first aspect. The method of the second aspect and its implementation forms provide the same advantages as the apparatus of the first aspect and its implementation forms, respectively.

According to a third aspect, the disclosure relates to a computer program comprising a program code for performing the method of the second aspect when executed on a computer.

According to a fourth aspect, the disclosure relates to an apparatus for multi-level decoding, the apparatus configured to perform a demapping of a sequence of input symbols based a predefined function of the symbol sequence to obtain a demapped sequence, wherein the input symbols include encoded shaping bits, decode the demapped sequence, and discard the decoded shaping bits.

The apparatus of the fourth aspect supports decoding according to the encoding scheme provided by the apparatus of the first aspect. Thus, the apparatus of the fourth aspect supports all the advantages mentioned above. The apparatus of the first aspect may be a transmitter, and the apparatus of the fourth aspect may be a receiver. Together, the apparatus of the first aspect and the apparatus of the fourth aspect may form a transmission system.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which:

FIG. 10 shows a table containing information about bit mapping performed by an apparatus according to an embodiment of the disclosure.

DETAILED DESCRIPTION OF EMBODIMENTS

Figure 1:
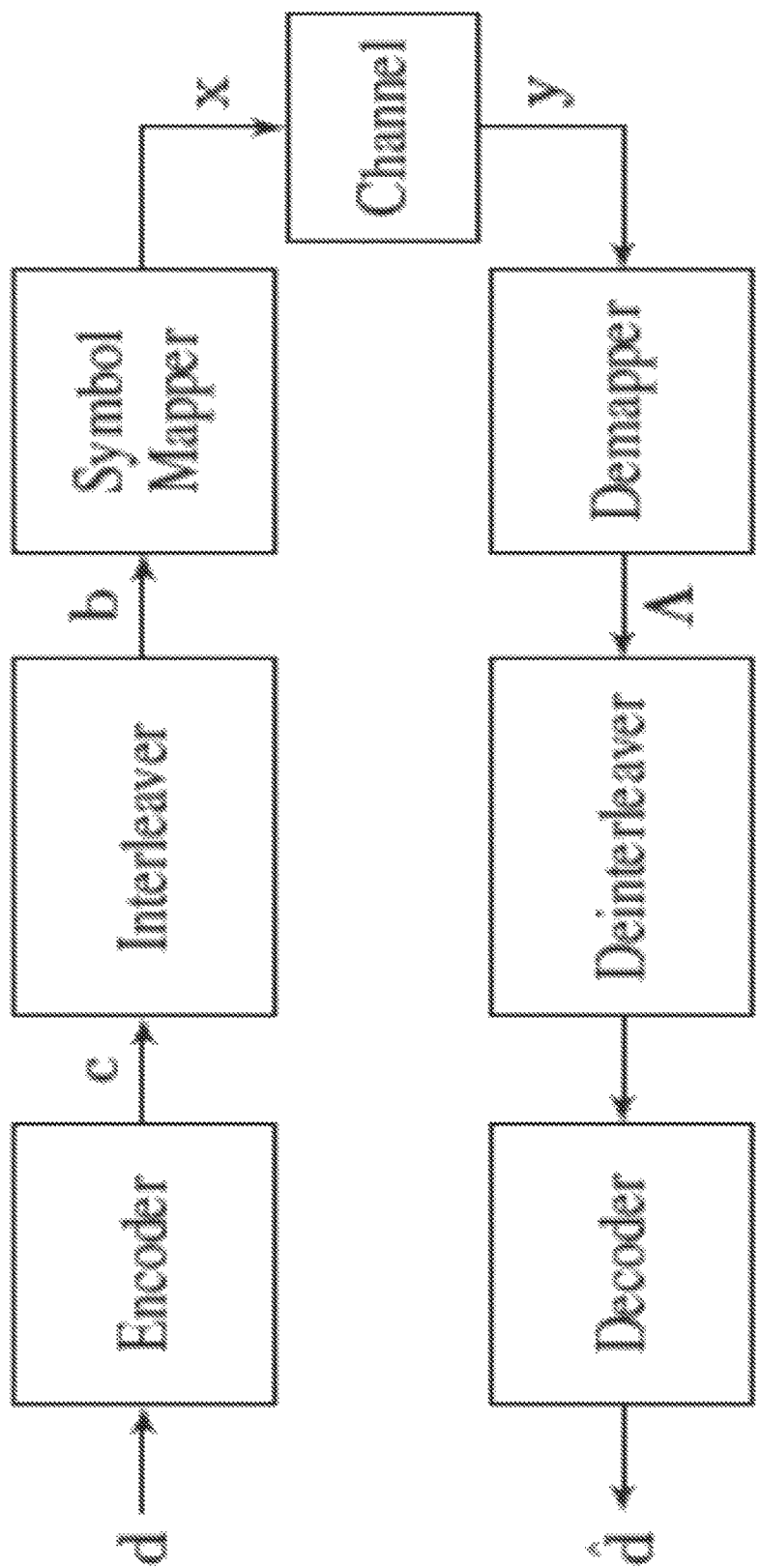
FIG. 1 shows a schematic representation of a conventional encoder and decoder.
Figure 2:
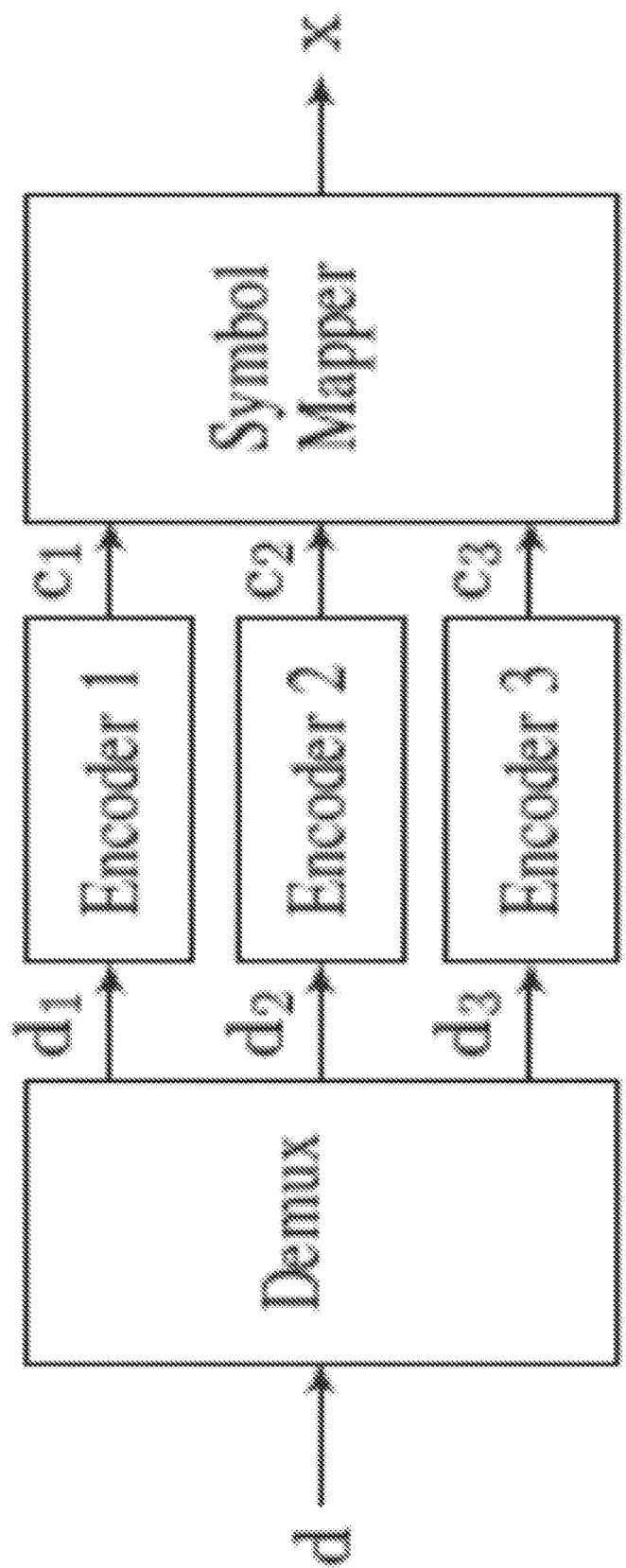
FIG. 2 shows a schematic representation of a conventional encoder.

Upon analyzing the existing solution it can be argued that asymptotically (with infinitely long codewords), MLC performs better than BICM. The reason is that the single stage demapping used by BICM does not take into account the dependence between bit-levels, whereas the multi-stage demapping of MLC allows full exploitation of the dependencies between bit-levels.

On the other hand, in the non-asymptotic regime, where the codewords have finite lengths, MLC may show performance degradations. This is due to finite length effects of the channel coding schemes: the performance of channel codes degrades as the codeword lengths get smaller. MLC requires multiple shorter length codewords (compared to a single long codeword in BICM), and, hence, suffers from a larger finite length loss. Therefore, BICM is preferred in many communication systems.

In general, any binary channel code (e.g., turbo codes, LDPC codes, convolutional codes, polar codes) can be used for both BICM and MLC. Polar codes are the recently developed forward error correction schemes (i.e. channel coding schemes) that can achieve the capacity of binary input memoryless channels. However, their performance with BICM is often poor compared to other modern coding schemes. On the other hand, it is known that polar codes work well with MLC.

Polar coding relies on the channel polarization phenomenon, where the physical channel is converted into polar sub-channels, which tend to have either very high or very low reliabilities asymptotically. A polar encoder assigns message bits to reliable channels, and (known) frozen bits to unreliable channels. A polar decoder (such as a successive cancellation (SC) or SC List (SCL) decoder) processes a noisy observation of the polar codeword together with the frozen bits, in order to estimate the message bits.

Let G denote the polar transform matrix of size n by n, which is defined as the $(\log_2 n)$-th Kronecker power of the 2 by 2 kernel:

$$F = \begin{bmatrix} 1 & 0 \\ 1 & 1 \end{bmatrix}.$$

A polar codeword c is obtained from the input sequence u by c=uG. Here, u contains k message bits d at indices I, and n-k frozen bits at indices F, where I and F denote the sets containing the indices of the polar sub-channels with high and low reliabilities, respectively. The performance of a polar code depends on the choice of the sets I and F.

In general, one can calculate the reliabilities of the polar sub-channels (for a given physical channel), and allocate the most reliable sub-channels to message bits, and the rest for frozen bits. A simpler approach is to use a polar sequence Q, similar to the polar sequence that is specified in the 5G New Radio specification. Such a polar sequence defines the reliability order of the polar sub-channels. For example, Q can include the sub-channel indices in order of ascending reliabilities. Accordingly, I and F can be easily computed by taking the last k and first n-k indices in Q, respectively.

The symbol mapper used in BICM or MLC schemes takes as input a sequence of m-bits, and maps them to a channel input symbol according to a bit-labeling scheme. For example, a mapper for 8-ASK maps 3 bits to one ASK symbol can take 8 possible values depending on the input bits. Usually, 'Gray labeling' is preferred for BICM, and 'Natural Binary Labeling' or 'Set Partitioning Labeling' are preferred for MLC.

Figure 6:
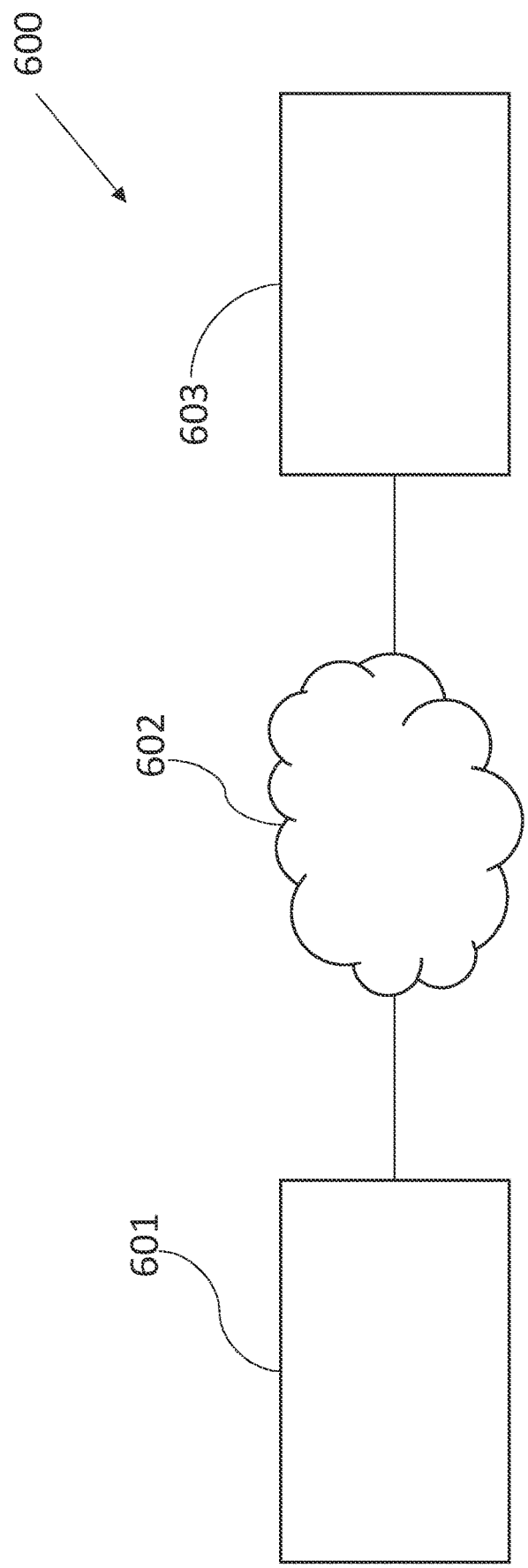
FIG. 6 shows a system comprising an encoder and a decoder communicating via a communication channel, according to embodiments of the disclosure.

FIG. 6 shows a system 600 comprising an apparatus (or encoder) 601 according to an embodiment, and an apparatus 603 (or decoder) according to an embodiment, which are configured to communicate via a communication channel 602, e.g. via an AWGN.

The apparatus 601 is configured to perform multi-level encoding of an input message into a symbol sequence, wherein the input message and symbol sequence comprise information bits. The apparatus 601 is specifically configured to perform the following steps:

Divide the input message into a plurality of sub-messages. Each of the plurality of sub-messages may have the different lengths.

Encode each of the sub-messages into a codeword. Thereby, a set of the sub-messages is encoded on the basis of the codewords obtained by encoding the sub-messages not in the set and on the basis of a predefined function of the symbols (i.e. of the symbol sequence). That is, the sub-messages not in the set are encoded, and the resulting codewords are provided as an input for the encoding of the sub-messages in the set. The other input for the encoding is the predefined function of the symbol sequence, which may be a norm associated to the symbol sequence, or a probability distribution function (or probability mass function) of the symbols.

Map the encoded sub-messages into corresponding symbols. For instance, the apparatus 601 may use a symbol mapper for performing the mapping.

Thus, the symbol sequence may be provided with a predefined characteristic, for instance, the symbols may have a predefined probability distribution (or a target probability distribution) after the symbol mapping. The symbol sequence may also fulfil a predefined norm (for example Euclidean norm, p-norm, or a distance of the symbol sequence to a predetermined sequence).

After the apparatus 601 has encoded the input message, and has output the symbols, it can send the symbol sequence to the apparatus 603, which is configured for multi-level decoding of an input symbol sequence. This apparatus 603 will be described in more detail further below.

Figure 7:
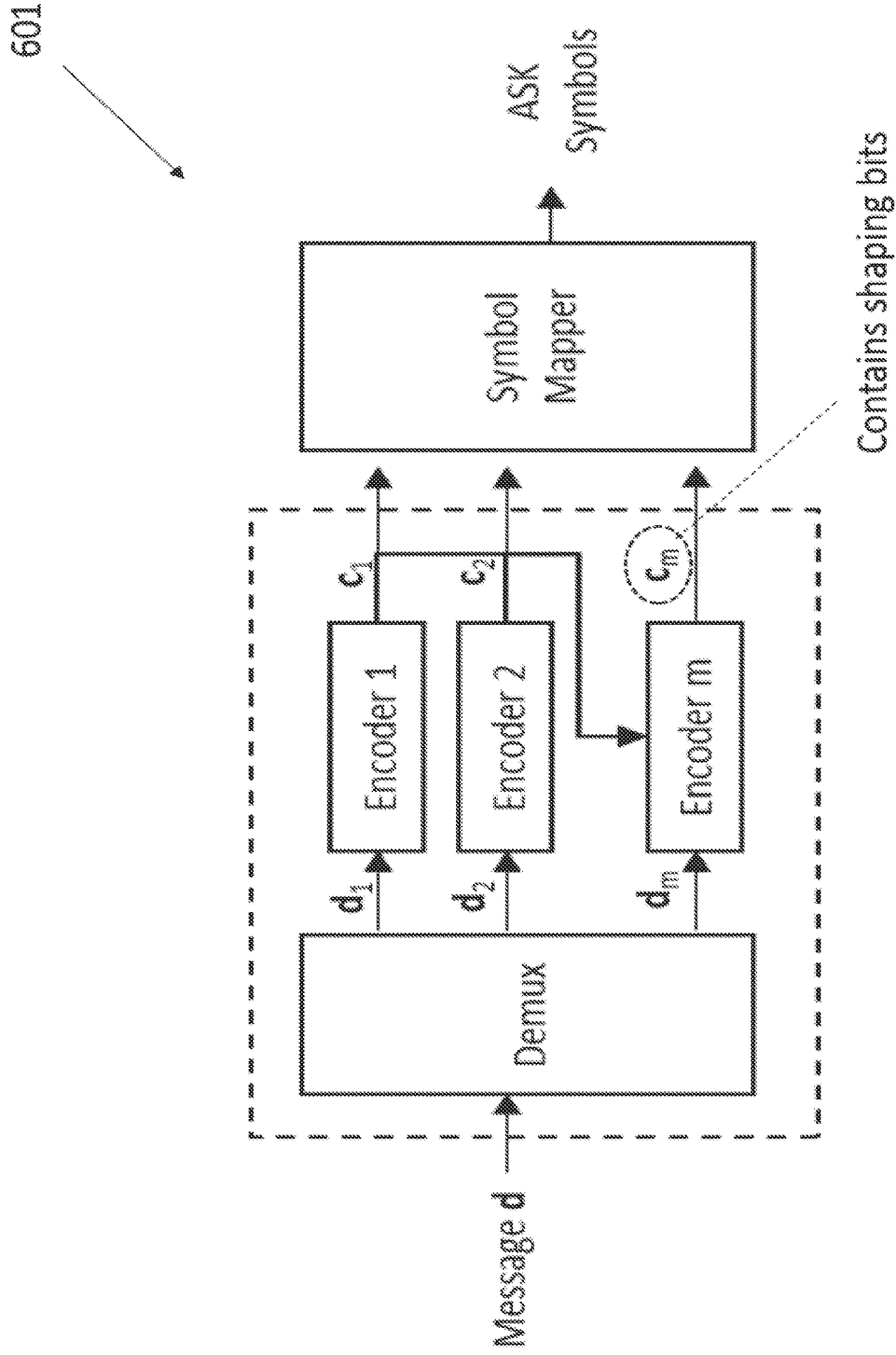
FIG. 7 shows an apparatus for encoding an input message according to an embodiment of the disclosure.

FIG. 7 shows the apparatus 601 according to an embodiment of the disclosure, which bases on the embodiment shown in FIG. 6. In particular, FIG. 7 shows the apparatus 601 with further, optional features. The apparatus 601 of FIG. 7 is configured to encode the input message d into a symbol sequence of ASK symbols.

In this embodiment, the apparatus 601 is further configured to encode the $m^{th}$ bit-level (defining the set of sub-messages; related to encoder m) in dependence of the previous bit-levels (sub-messages not in the set of sub-messages; related to encoders 1, 2). Further, the encoding in this embodiments may be in dependence of the predefined function, e.g. a predefined probability distribution, which could be derived from the codewords of the previous bit-levels or and external input. As a result, for instance, a predefined probability distribution of the ASK symbols can be obtained, in particular, one that approximates very accurately a Gaussian distribution (see FIG. 8).

A decoder can be used as encoder to encode each sub-message in the set of sub-messages, where the decoder is configured to search for a codeword that represents the sub-message and at the same time possesses certain properties, such as a certain probability distribution (or a conditional probability distribution) of the bits in the codeword. This can be realized for example as described in the work of Iscan et al "*Probabilistically Shaped Multi-Level Coding with Polar Codes for Fading Channels,*" In 2018 IEEE Globecom Workshops (GC Wkshps), pp. 1-5 with reference to polar codes.

Moreover, a simple successive cancellation (SC) decoder can be used as encoder to encode each sub-message in the set of sub-messages, i.e. here as the encoder in the $m^{th}$ bit-level, which has a much lower computational complexity compared to, for example, a list decoder. In fact, a SC decoder has the same order of complexity as a conventional polar encoder. Therefore, advantageously, the proposed scheme is not more complex than a conventional MLC scheme based on polar codes.

In the following a summary of the steps is given, which may be performed by the apparatus 601 of FIG. 7:

The apparatus 601 is configured to use an MLC scheme, wherein only a single bit-level may be (probabilistically) shaped. However, the bit-level is encoded depending on the previously encoded bit-levels. As a result, for example, the obtained probability distribution of the ASK symbols can be determined, e.g. to approximate very accurately a Gaussian distribution. Thus, the shaping loss in the channel 602, particularly and AWGN, can be significantly reduced.

The apparatus 601 can be configured to use an SC decoder for encoding the $m^{th}$ bit-level. This provides the advantage that the apparatus 601 is also advantageous from a complexity point-of-view.

The apparatus 601 is advantageous for reliable data transmission, is based on multi-level coding (MLC), and may be further configured to:

Transmit polar codewords in each bit-level (or at least in one bit-level, in particular at least in the $m^{th}$ bit level). That is, the apparatus 601 may be configured to encode each sub-message in the set of sub-messages on the basis of polar coding.

Generate in (at least) one bit-level (denoted as the shaped bit-level), the codewords in dependence on the codewords from other bit-levels, such that after the symbol mapping a predefined probability distribution or target probability distribution is obtained. That is, the apparatus 601 may be further configured to allocate, to each sub-message in the set of sub-messages, a sequence of shaping bits.

Use a polar decoder, in that bit-level, to perform the encoding.

Set the shaped bit-level as the sign bit-level, i.e., the bit-level that defines the sign of the resulting symbols.

In the following, steps that can be performed by the apparatus 601 on the transmitter side are further detailed.

The transmission scheme as given in FIG. 7 can be used, as well as a symbol mapper with e.g. a natural (binary) labeling. In an embodiment, for natural labeling with m bit-levels, the mapper output may take values $\{\pm 1, \pm 3, \pm 5, \ldots, \pm(2^n-1)\}$. The mapper output may be scaled by a predefined constants, for example to satisfy power requirements.

For example, for 8-ASK (with m=3) the output symbols $\{-7, -5, \ldots, 5, 7\}$ are possible. The mapping of each bit-sequence of m bits to the ASK symbols may be performed according to the binary representation of natural numbers between 0 and $(2^m-1)$ in ascending or descending order. The table in FIG. 10 gives an example for m=3, wherein three bits $b_1 b_2 b_3$ are mapped to 8-ASK symbols x. Note that the last bit level ($b_3$) contains the sign-bit, i.e. depending on whether $b_3$ is one or zero, the resulting ASK symbol x has a negative or positive sign.

This scheme can easily be extended to symbols with complex numbers. In such a case, there will be two sign bit-levels in total (one sign bit-level per complex dimension).

Figure 11:
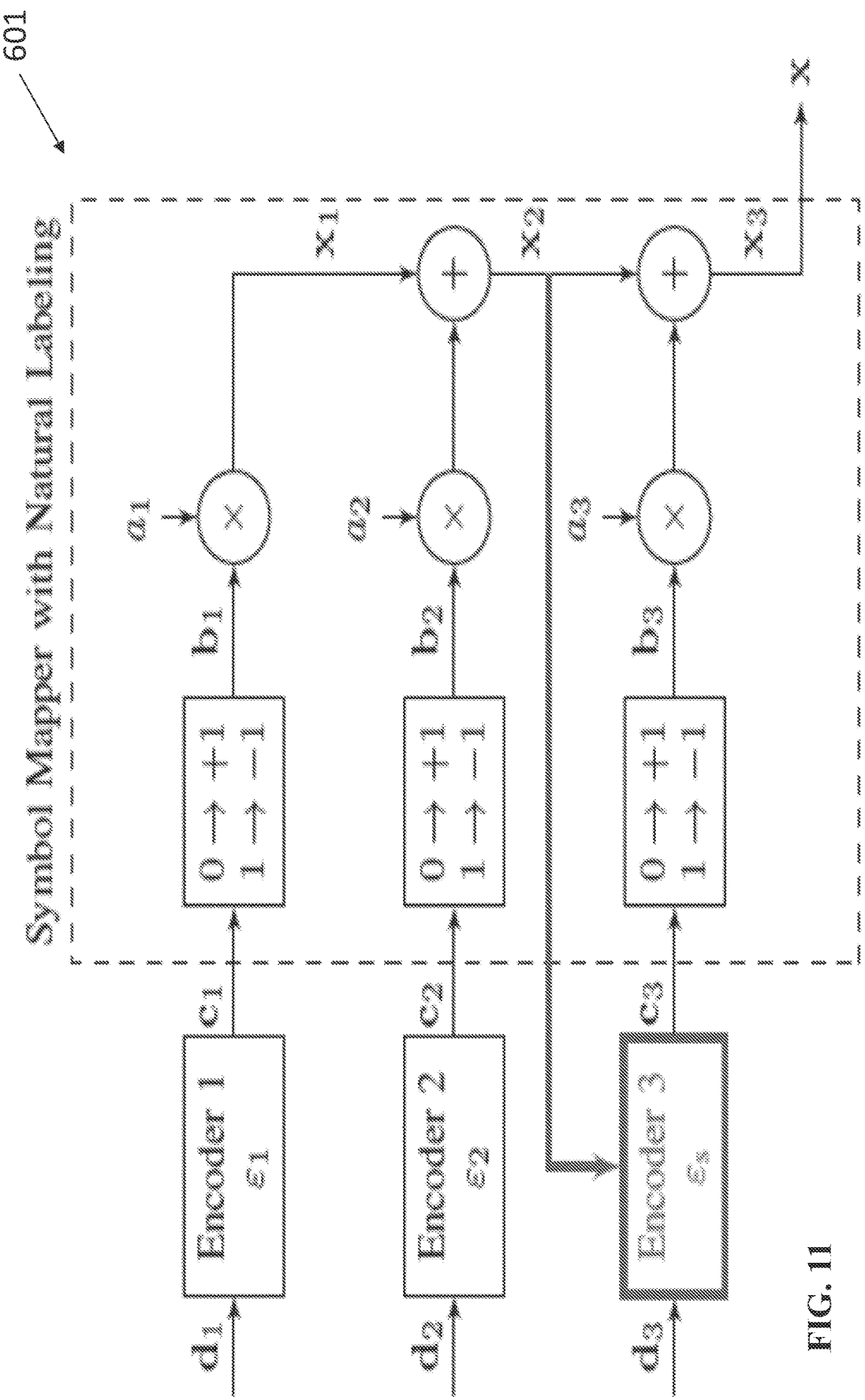
FIG. 11 shows an apparatus for encoding an input message according to an embodiment of the disclosure.

In an embodiment, such a symbol mapper can be implemented as given in the dashed box of FIG. 11 for an example with m=3. Here, first the codeword bits $c_i$ (zeros and ones) are mapped to a sequence $b_i$ containing $\pm 1$, which are then scaled by $a_i = 2^{(i-1)}$. The sequence x that contains the ASK symbols is obtained by summing up these scaled sequences. The cumulative sum of the scaled sequences of the bit levels 1 to i can be noted as $x_i$.

As described above, the encoder in the $m^{th}$ bit-level (i.e. the sign bit-level) is a modified encoder. This encoder is denoted $\varepsilon_s$. In an embodiment, a polar decoder is used as the encoder, e.g. a successive cancellation (SC) decoder, a successive cancellation list (SCL) decoder, a belief propagation (BP) decoder, or a flip decoder can be employed. Moreover, the encoder $\varepsilon_s$ generates its output dependent on $x_{m-1}$. Note that $x_{m-1}$ is constructed based on the codewords in the bit-levels 1 to m−1. Therefore, the output of $\varepsilon_s$ is dependent on the codewords in all previous bit-levels.

More specifically, the encoder $\varepsilon_s$ looks for a codeword $c_m$ that represents the $m^{th}$ message part $d_m$ (i.e. $\varepsilon_s$ encodes $d_m$), and at the same time causes the ASK symbols in x to be distributed according to the target probability distribution $P_X$. For this purpose, some of the reliable polar sub-channels can be allocated in the $m^{th}$ bit-level for shaping bits, which do not carry any information, but cause x to be distributed according to the target probability distribution $P_X$.

The number of shaping bits (s) defines how much resources (in this case polar sub-channels) are allocated for signal shaping. In conventional schemes without shaping no resources are allocated for shaping, i.e. s=0. The number of shaping bits can be chosen to get the best approximation of the target distribution. On the other hand, each shaping bit uses an additional resource. Therefore, too many shaping bits should not be used. The optimal number of shaping bits is the minimum number that gives the maximum gain.

If $k_m$ message bits are to be transmitted on the $m^{th}$ bit-level (i.e. the length of $d_m$ is $k_m$), and s shaping bits are to be used, assuming a fixed polar sequence, the most reliable s polar sub-channels (described by the set S) are allocated for the shaping bits, the next most reliable $k_m$ polar sub-channels (described by the set I) for message bits, and the rest (denoted by the set F) for frozen bits.

Under these conditions, a polar decoder as $\varepsilon_s$ (with codeword length n and rate $(k_m+s)/n$) can be used, wherein the following parameters are employed:

The known bits (e.g. zeros) can be used as frozen bits at indices F.

The message bits $d_m$ can be used as additional frozen bits at indices I.

S can be used as the indices of the unknown bits (to be recovered by the decoder).

Λ (defined below) can be used as the decoder input in log-likelihood ratio (LLR) form (noisy channel observation).

In general, Λ can be defined as a function of $x_{m-1}$. Hence, it is also a function of the codeword bits from the previous bit-levels. Λ is proportional to $-x_{m-1}$ for a Maxwell-Boltzmann target distribution that minimizes the transmit power for a given rate. Therefore, $\Lambda = -x_{m-1}$ can be used. Moreover, a simple successive cancellation (SC) decoder can be sufficient to obtain good gains. A more complex SCL decoder results in a better performance, but at a cost of increased complexity.

Figure 8:
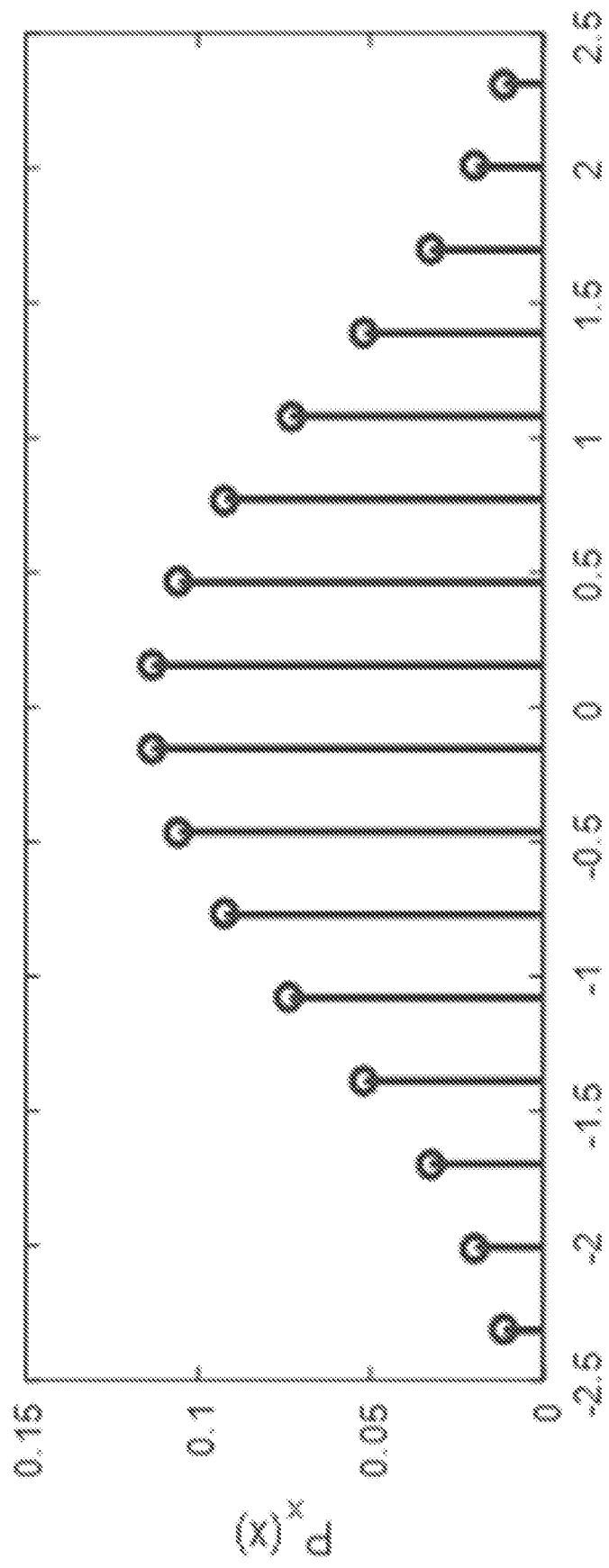
FIG. 8 shows a probability distribution of ASK symbols obtained by an apparatus according to an embodiment of the disclosure.

Note that this polar decoding operation would search for the shaping bits (and hence the resulting codeword $c_m$), which would cause the resulting codeword to have the desired probability distribution conditioned on $x_{m-1}$. FIG. 8 shows the resulting distribution of the ASK symbols, where m=4 and roughly ⅓ of the polar sub-channels in the $m^{th}$ bit-level is allocated for shaping bits.

From a different perspective, this polar decoding operation can also be seen as the solution of an energy minimization problem, i.e. the decoder looks for a codeword, such that the resulting ASK symbols have a minimum average energy, i.e. minimum Euclidean norm.

To sum up, the following features can be considered for the apparatus 601:

An MLC scheme can be used based on polar codes, where polar codewords are used in each bit-level.

A natural (binary) labelling can be used.

A modified encoder $\varepsilon_s$ can be used in the $m^{th}$ bit-level (which corresponds to the sign bit-level).

The codeword $c_m$ can be generated by the encoder $\varepsilon_s$ in dependence on the codewords from previous bit-levels ($c_1$ to $c_{m-1}$).

The encoder $\varepsilon_s$ can be implemented by using a polar decoder, e.g., by a simple SC decoder or more complex SCL decoder.

The codeword in the $m^{th}$ bit-level can contain (besides message and frozen bits) shaping bits, which do not carry any additional information, but cause the resulting codeword to have a probability distribution conditioned on the bits of the previously encoded codewords, which further results in a target or first probability distribution $P_X$ of the ASK symbols after symbol mapping.

The number of shaping bits s is a parameter, which can be chosen to optimize the performance: if no shaping bits are used (s=0), then no shaping gain can be obtained. If too many shaping bits are used, then it can lead to an inefficient usage of the available resources. Our findings indicate that using roughly ⅓ of the polar sub-channels in the sign-bit level is a good choice.

Figure 9:
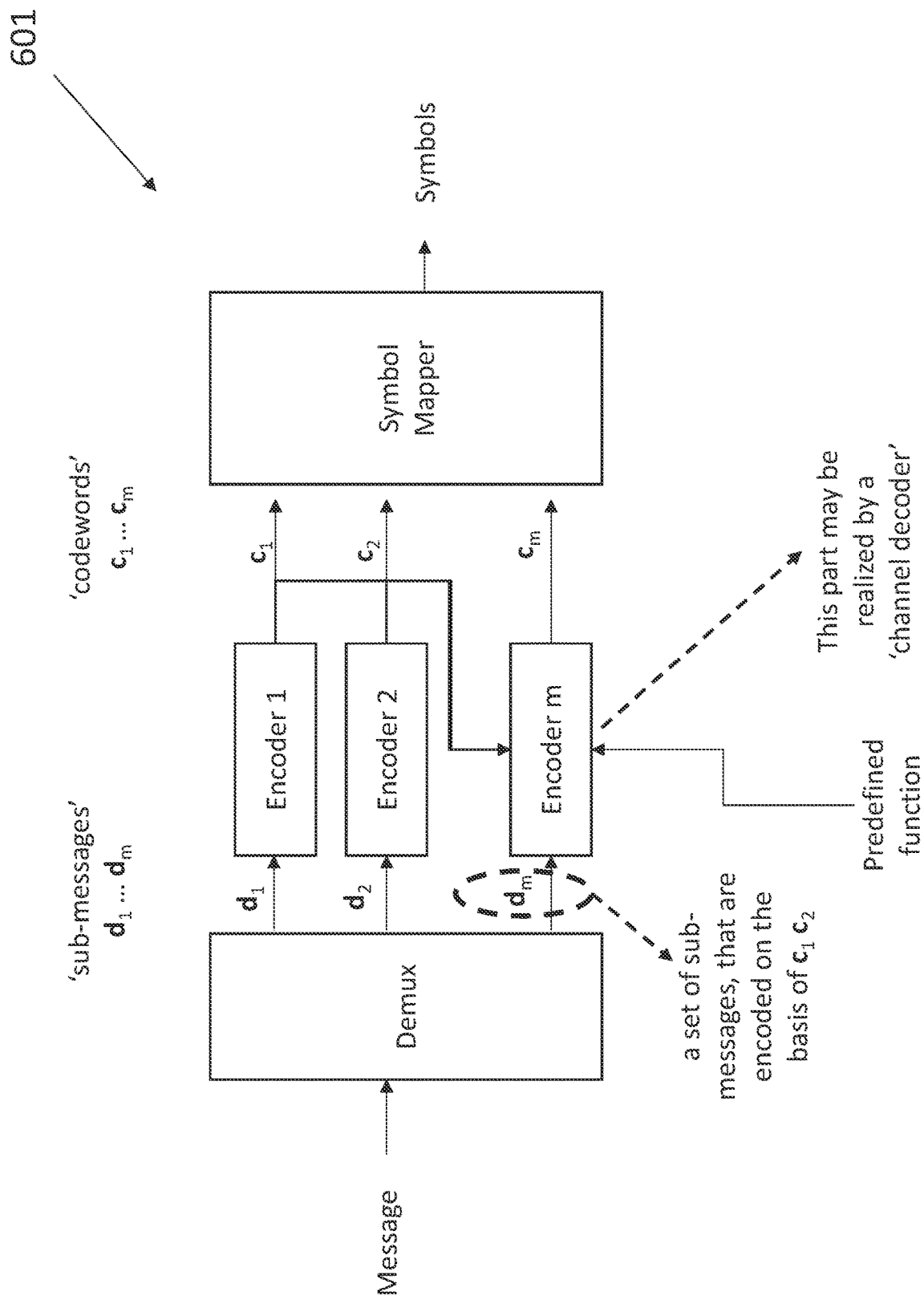
FIG. 9 shows apparatus for encoding an input message according to an embodiment of the disclosure.

FIG. 9 shows the apparatus 601 according to an embodiment of the disclosure, which bases on the embodiment shown in FIG. 7. In particular, FIG. 9 shows the apparatus 601 with further, optional features. The apparatus 601 of FIG. 9 is configured to encode the input message into a symbol sequence, e.g. of ASK symbols.

In this embodiment, the apparatus 601 is configured to encode the $m^{th}$ bit-level (defining the set of sub-messages; related to encoder m) in dependence of the previous bit-levels (sub-messages not in the set of sub-messages; related to encoders 1, 2 and in dependence of the predefined function (external input), e.g. a predefined probability distribution. As a result, for instance, a predefined probability distribution of the ASK symbols can be obtained, in particular, one that approximates very accurately a Gaussian distribution (see FIG. 8). In particular, a channel decoder may be used to encode the $m^{th}$ bit-level.

In general, an encoder maps a message sequence to a codeword sequence. The operation is one-to-one, i.e., for each message sequence, there is another codeword sequence. In general, codeword sequences are longer than the message sequences. For example, assume an encoder that maps a binary message sequence of k bits to a codeword sequence of n bits with n>k. In this case, any binary sequence of length k can be the input of the encoder (there are $2^k$ possibilities of length k binary sequences), and there are $2^k$ possible codeword sequences of length n. Note that in general, there are $2^n$ different binary sequences of length n, but not every length-n sequence is a codeword. The set of all possible codeword sequence is called a codebook.

In this context, a channel decoder is a device that takes as input an unconstrained sequence of length n, and looks for a codeword sequence in the codebook, and its corresponding message sequence. Both encoders and decoders define mappings between sequences. Conventionally, encoders are used to generate codewords at the transmitters, and decoders are used to search for most likely codeword (and its corresponding message sequence) given the received noisy signal at the receiver.

In the apparatus 601 according to an embodiment of the disclosure, a (channel) decoder may be used, such that the codeword found by this channel decoder has two properties: it represents the message, and at the same time it has certain desired properties (i.e., the bits in the codeword are distributed according to a desired probability distribution, or desired conditional probability distribution). This may be realized by introducing shaping bits as described above, which give a new degree of freedom for mapping the message sequence to a codeword. Shaping bits can be seen as additional bits (to be appended to message bits) that do not carry any information, but cause the codeword bits to have the desired probability distribution. How to obtain the values of the shaping bits can be formulated as a channel decoding operation (as described in the work of Iscan et al). Therefore in the problem at hand, a channel decoder can be used in the apparatus 601 instead of an encoder.

After the apparatus 601 (of any one of the above described) has encoded the input message, and has output the symbol sequence, it can send the symbol sequence over the channel 602 to the apparatus 603 (see FIG. 1), which is configured for multi-level decoding of an input symbol sequence. This apparatus 603 may, for example, be configured, to:

Perform a demapping of the sequence of input symbols based on a predefined function of the symbol sequence (e.g., based on the predefined function of the apparatus 601, obtained from the apparatus 601 or from another entity) to obtain a demapped sequence, wherein the input symbols include encoded shaping bits.

Decode the demapped sequence.

Discard the decoded shaping bits.

Figure 3:
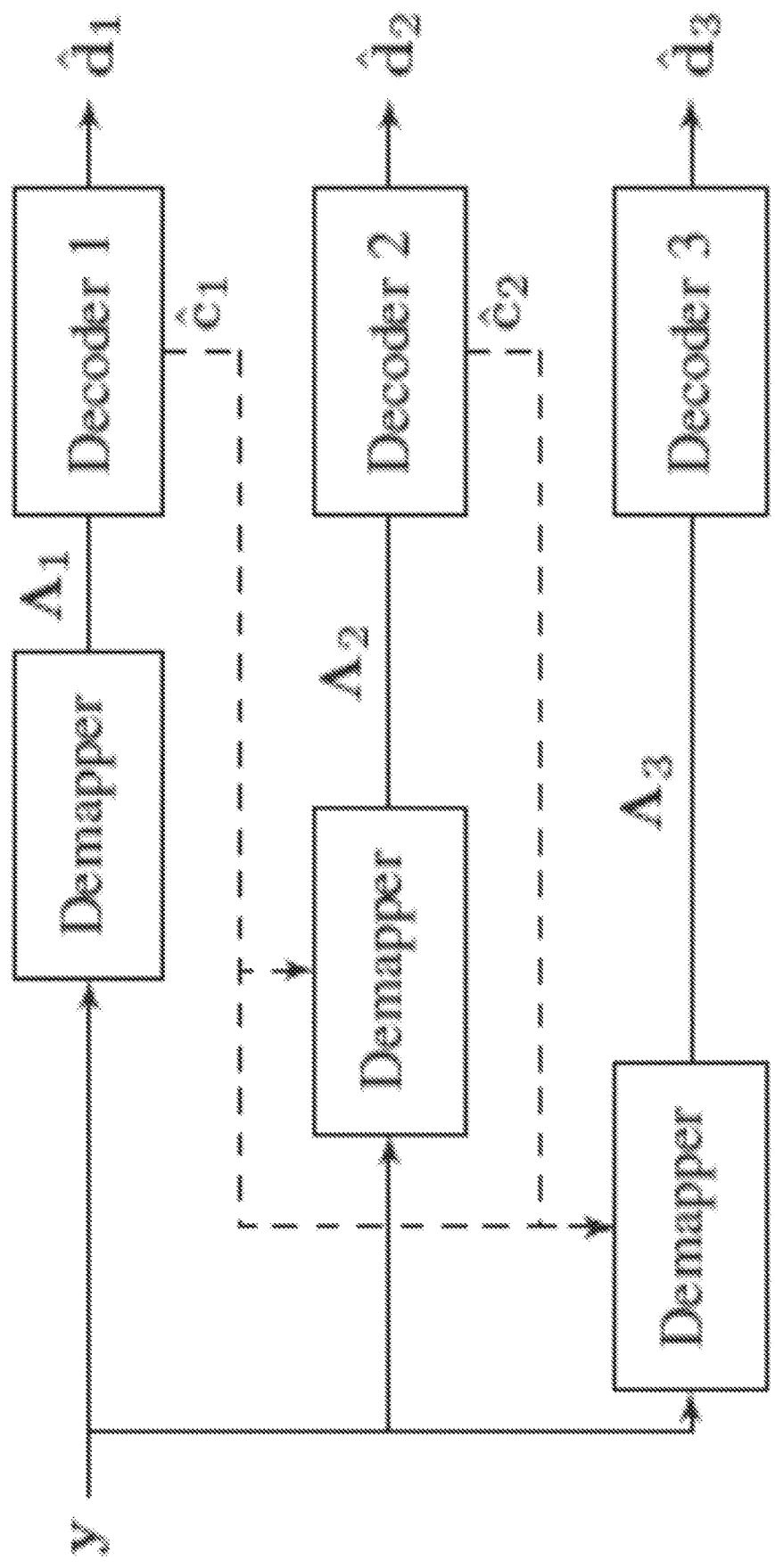
FIG. 3. shows a schematic representation of a conventional decoder.
Figure 4:
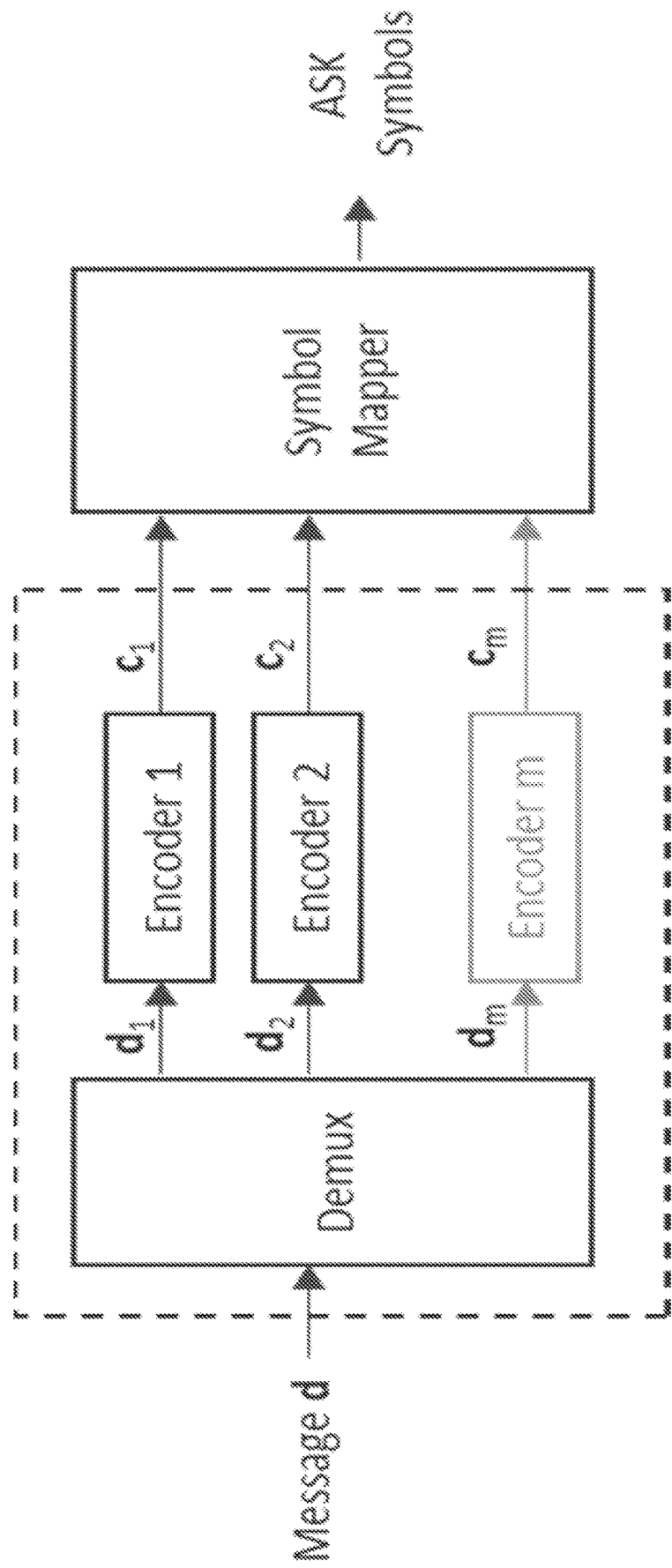
FIG. 4 shows a schematic representation of a conventional encoder.
Figure 5:
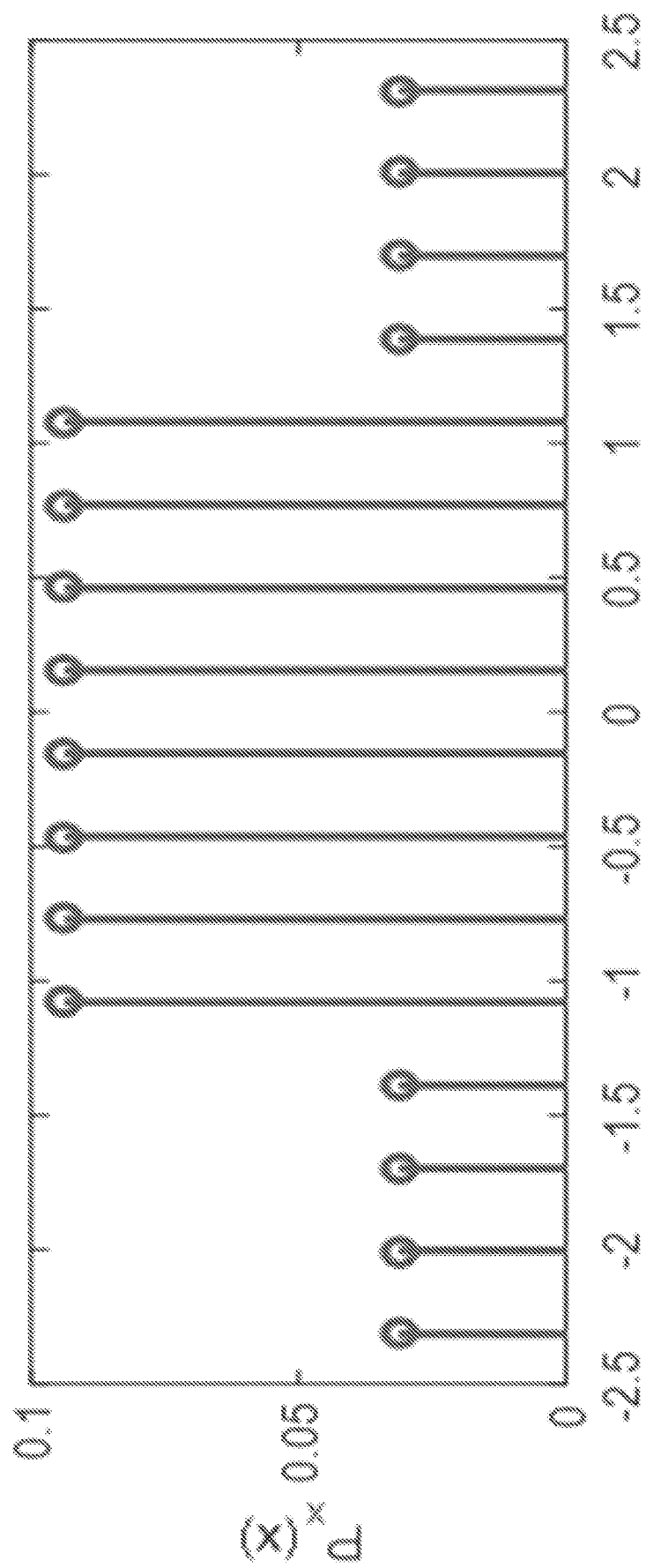
FIG. 5 shows a probability distribution of ASK symbols.

In particular, the apparatus 603 may be based on an MLC receiver as depicted in FIG. 3. However, certain modifications may be performed. Particularly, compared to a conventional MLC receiver, the following parameters are preferably known at the apparatus 603:

The predefined function of the symbol sequence, e.g., the probability distribution function $P_X$ of the ASK symbols.

The number of shaping bits s.

The set S, which indicates the indices of the shaping bits.

In general, all these parameters may be signaled to the apparatus 603 (e.g., using a control channel), such that the apparatus 603 can use these parameters to revert the operations performed at the apparatus 601. However, some simplifications can be made, because all these parameters are related to each other.

In the embodiment above, a fixed polar sequence has been assumed, and the most reliable s indices have been used in this sequence in order to build S. Therefore, in such a situation the apparatus 603 can already obtain S, if the number of shaping bits s is known. Moreover, using roughly ⅓ of the polar sub-channels for shaping bits is a good choice. Accordingly, a fixed rule can be used in order to obtain the number of shaping bits. Lastly, since s and $P_X$ are related, the resulting $P_X$ for each choice of s can be precomputed, and stored in a look-up table, such that additional control signaling is avoided.

Conventional MLC receivers assume that the ASK symbols are uniformly distributed ($P_X$ is uniform). In an embodiment, $P_X$ is non-uniform, and, therefore, the demapper needs to generate its output depending on $P_X$. For some typical distributions (like Gaussian distribution or Maxwell-Boltzmann distribution), this can be accomplished by scaling the demapper inputs by a constant, where the constant depends on $P_X$ and the channel noise variance.

Compared to a conventional MLC receiver, there are additional shaping bits that are allocated in some polar sub-channels in the sign bit-level. The values of the shaping bits are unknown to the apparatus 603. During decoding of this bit-level, the decoder can treat the shaping bits as the message bits, which are also unknown. At the end of the decoding process, the apparatus 603 can basically discard the shaping bits as they do not carry any additional information. Moreover, if all of the message bits are recovered during decoding, the decoder can perform an early termination without finishing the whole decoding process (since the remaining unknown bits are only shaping bits). As another alternative, the apparatus 603 can extract all shaping bits and message bits at the output of the decoder, and calculate another copy of the shaping bits based on the message bits (as it is done at the transmitter). Later, the apparatus 603 can compare this copy of the shaping bits and the shaping bits at the output of the decoder, and if they are not identical, the apparatus 603 can declare an error. This can be seen as an additional error detection mechanism, which can also be used for picking the correct codeword from the output of a list decoder.

To sum up, in embodiments of the disclosure, the following features may be implemented at the receiver side apparatus 603:

The probability distribution $P_X$ of the ASK symbols, the number of shaping bits s and the set S are the additional parameters, which are used by the apparatus 603 to recover the transmitted message. Therefore, they may be signalled to the apparatus 603 (e.g., using a control or communication channel other than the channel 602). However, as they are related to each other, one can only signal a subset of them, such that the other parameters are obtained depending on these parameters. Alternatively, one uses fixed rules to obtain these parameters, such that no additional signalling is required.

The demapper may use $P_X$ during demapping. For some typical probability distributions, this can be accomplished by scaling the demapper inputs by a scalar factor that depends on $P_X$ and the channel noise variance.

The apparatus 603 may treat the shaping bits as if they were message bits. After the decoding is finished, the apparatus 603 can discard the shaping bits, or use them as an error detection mechanism. Alternatively, the decoder can also perform early-termination if all message bits are decoded.

Figure 12:
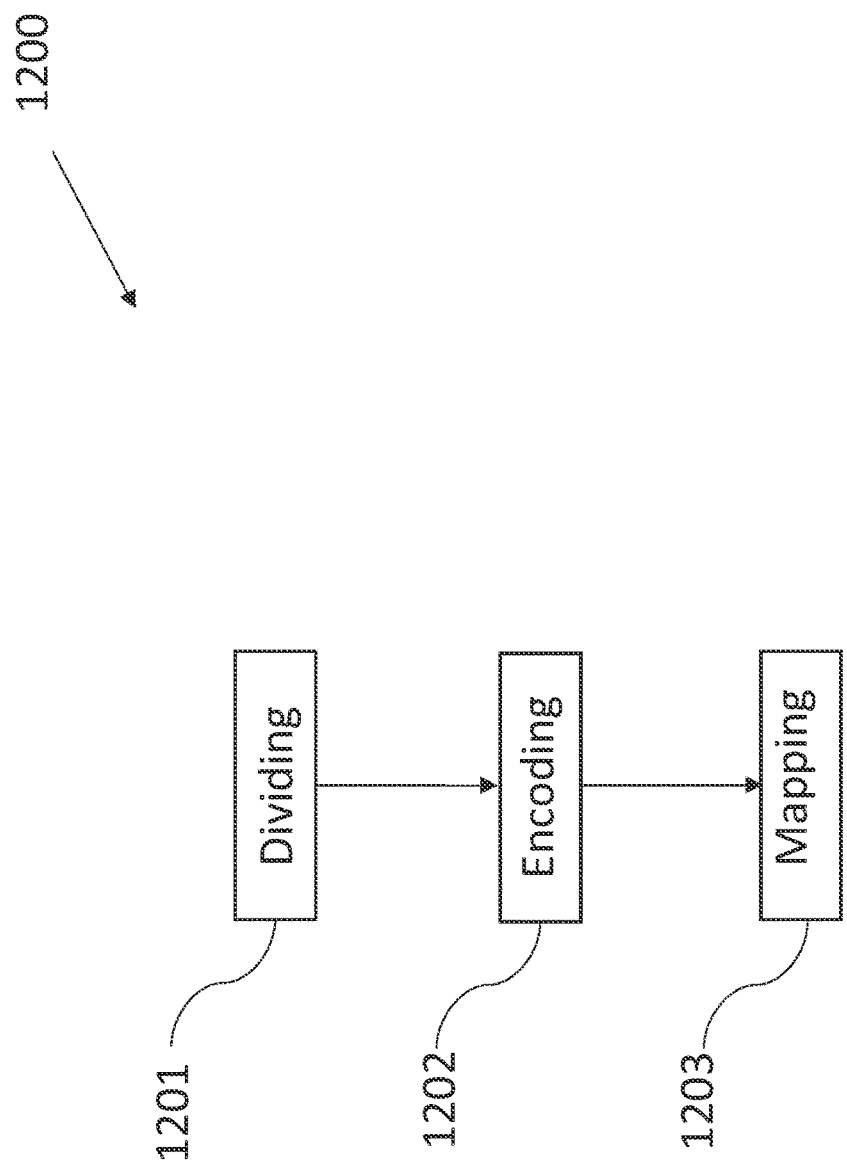
FIG. 12 shows a method for encoding an input message according to an embodiment of the disclosure.

FIG. 12 shows a method 1200 for encoding an input message into a symbol sequence, according to an embodiment. The method 1200 may be performed by the apparatus 601. The method 1200 for multi-level encoding of the input message, which comprises information bits, comprises the steps of:

Dividing 1201 the input message into a plurality of sub-messages.

Encoding 1202 each of the sub-messages into a codeword, wherein a set of the sub-messages is encoded on the basis of the codewords obtained by encoding the sub-messages not in the set and a predefined function of the symbol sequence.

Mapping 1203 the encoded sub-messages into corresponding symbols.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. An apparatus for multi-level encoding of an input message into a symbol sequence comprising information bits, the apparatus comprising at least one processor and one or more memories coupled to the at least one processor, the one or more memories comprising program codes that, when executed by the at least one processor, cause the apparatus to:
   divide the input message into a plurality of sub-messages;
   encode each of the plurality of sub-messages into a codeword,
      wherein a first set of sub-messages from the plurality of sub-messages is encoded using a channel decoder that is a polar decoder and on the basis of one or more codewords obtained by encoding a second set of sub-messages-from the plurality of sub-messages and a predefined function of the symbol sequence,
      wherein the predefined function is at least one of a probability distribution function of the symbols of the symbol sequence and a norm associated to the symbol sequence, and
   wherein each of the plurality of sub-messages of the first set is allocated a sequence of shaping bits that is selected based on the sub-message, the codewords obtained by encoding the plurality of sub-messages of the second set and the predefined function; and
   map the codewords into the corresponding symbols of the symbol sequence, wherein the symbols have multiple bit-levels, and wherein at least one bit-level contains bits from only a particular codeword.

2. The apparatus according to claim 1, wherein the at least one bit-level corresponds to a sign bit-level.

3. The apparatus according to claim 1, wherein the program codes, when executed by the at least one processor, cause the apparatus to map the encoded sub-messages based on natural binary labelling, Gray labelling, or set partitioning labelling.

4. The apparatus according to claim 1, wherein a probability distribution of the symbols is a non-uniform distribution.

5. The apparatus according to claim 1, wherein the symbols are amplitude shift keying symbols or quadrature amplitude modulation symbols.

6. The apparatus according to claim 1, wherein the program codes, when executed by the at least one processor, cause the apparatus to provide the symbols to a receiver, and to further provide the receiver with at least one of the following parameters using a separate channel than for providing the symbols:
   a size of the sequence of shaping bits included in the symbols;
   the predefined function of the symbol sequence; and
   an indicator or a rule for allocating how the sequence of shaping bits.

7. A method for multi-level encoding of an input message into a symbol sequence comprising information bits, the method comprising:
   dividing the input message into a plurality of sub-messages; encoding each of the plurality of sub-messages into a codeword,
   wherein a first set of sub-messages the plurality of sub-messages is encoded using a channel decoder that is a polar decoder and on the basis of one or more codewords obtained by encoding a second set of sub-messages from the plurality of sub-messages and a predefined function of the symbol sequence,
   wherein the predefined function is at least one of a probability distribution function of the symbols of the symbol sequence and a norm associated to the symbol sequence, and
   wherein each sub-message of the first set of sub-messages from the plurality of sub-messages is allocated a sequence of shaping bits that is selected based on the sub-message, the codewords obtained by encoding the plurality of sub-messages of the second set and the predefined function; and
   mapping the codewords into the corresponding symbols of the symbol sequence,
   wherein the symbols have multiple bit-levels, and
   wherein at least one bit-level contains bits from only a particular codeword.

8. The method according to claim 7, further comprising: mapping the encoded sub-messages based on natural binary labelling, Gray labelling, or set partitioning labelling.

9. The method according to claim 7, including providing the symbols of the symbol sequence to a receiver, and further providing the receiver with at least one of the following parameters using a separate channel than for providing the symbols:
   a size of the sequence of shaping bits included in the symbols;
   the predefined function of the symbol sequence; and
   an indicator or a rule for allocating the sequence of shaping bits.

* * * * *

UNITED STATES PATENT AND TRADEMARK OFFICE
CERTIFICATE OF CORRECTION

| | | |
|---|---|---|
| PATENT NO. | : 12,113,652 B2 | Page 1 of 1 |
| APPLICATION NO. | : 17/728659 | |
| DATED | : October 8, 2024 | |
| INVENTOR(S) | : Iscan et al. | |

It is certified that error appears in the above-identified patent and that said Letters Patent is hereby corrected as shown below:

In the Claims

Claim 6: Column 14, Line 10: "an indicator or a rule for allocating how the sequence of" should read as -- an indicator or a rule for allocating the sequence of --.

Claim 7: Column 14, Line 18: "wherein a first set of sub-messages the plurality of sub-" should read as -- wherein a first set of sub-messages from the plurality of sub- --.

Signed and Sealed this
Twentieth Day of May, 2025

Coke Morgan Stewart
*Acting Director of the United States Patent and Trademark Office*